Patented Aug. 30, 1932

1,875,243

UNITED STATES PATENT OFFICE

HANS JOHNER, OF BASEL, SWITZERLAND, ASSIGNOR TO THE FIRM SOCIETY OF CHEMICAL INDUSTRY IN BASLE, OF BASEL, SWITZERLAND

DIAZO-PREPARATIONS AND PROCESS OF MAKING SAME

No Drawing. Application filed April 29, 1931, Serial No. 533,871, and in Switzerland May 21, 1930.

The present invention relates to the manufacture of new diazo-preparations. It comprises the process of making these preparations, as well as the new preparations themselves.

The diazo-compounds of the amino-derivatives of diarylethers of the general formula

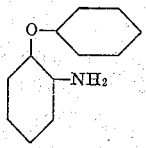

wherein the two benzene nuclei may carry substituents, have acquired importance in the production of fast tints on the fibre. Particularly valuable among these are those which correspond with the general formula

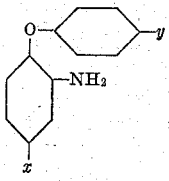

wherein $x$ stands for halogen and $y$ for hydrogen, alkyl, O-alkyl or halogen. The diazotization of these derivatives, however, offers certain difficulties, so that the products must be used in the form of diazo-preparations produced by the dye-makers. Such preparations have hitherto been made with the aid of aromatic sulfonic acids.

According to this invention, the diazo-compounds of the said amines are caused to separate in the form of mineral acid salts by neutralizing completely or approximately completely by means of a suitable neutralizing agent the concentrated diazo-solution which always contains a considerable excess of free mineral acid.

If necessary, the diazo-compound may be salted out by means of an easily soluble salt, preferably of the mineral acid in question.

The new diazo-hydrochlorides form yellow crystalline powders and correspond very probably with the general formula

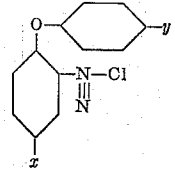

wherein $x$ stands for a halogen atom and $y$ for hydrogen, alkyl, O-alkyl or halogen, or quite generally with the general formula

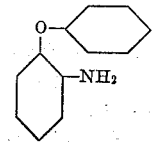

wherein the two benzene nuclei may carry substituents.

The following examples illustrate the invention:—

Example 1

220 parts by weight of 4-chloro-2-aminodiphenylether are finely powdered, sifted and well mixed with 105 parts of sodium nitrite. The mixture is introduced gradually, while stirring and cooling, into a mixture of 300 parts by weight of ice and 300 parts by volume of hydrochloric acid of 20° Bé. The filtered diazo-solution is now neutralized by cautious addition of chalk (about 25 parts by weight) and the hydrochloride of the 4-chloro-2-diazo-1-diphenylether of the probable formula

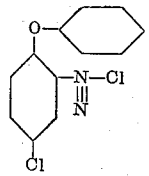

is salted out by addition of 200 parts by weight of magnesium chloride. This hydrochloride forms beautiful yellow crystals and is obtained in good yield. It can easily be filtered or centrifuged and then dried at a low temperature. It can, however, before being dried, and therefore in still moist condition, be mixed with the usual dyeing auxiliaries or with any suitable diluent, whereby its explosiveness (which indeed is not very great) may be essentially diminished. The yellow crystals of the hydrochloride are remarkably freely soluble in water to a neutral solution.

In like manner the process can be conducted with other diazo-compounds of the diarylethers or with other mineral acids.

*Example 2*

54 parts of the hydrochloride of 4-chloro-2-aminophenylpara-cresylether are stirred with 30 parts by volume of hydrochloric acid and 60 parts of ice, and then diazotized by carefully adding 15 parts of sodium nitrite dissolved in 30 parts of water. After the diazotization is complete, the whole is filtered and the clear solution neutralized by adding chalk in portions, filtered once more, if necessary, and the diazonium chloride of the probable formula

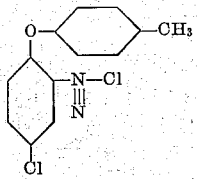

is then separated by addition of easily soluble chlorides, such as, for example, 20 parts of magnesium chloride, and of 20 parts of anhydrous calcium chloride. On standing in the cold the diazonium chloride separates in the form of large, yellow crystals.

In this and in the preceding example the chalk may be replaced by other suitable neutralizing agents, such as calcium bicarbonate, magnesium carbonate, aluminium oxide. Crystalline separations may also be obtained after neutralizing the acid in excess, if the diazotization is carired out with sulfuric acid or phosphoric acid instead of with hydrochloric acid.

In like manner the process is conducted with other aminodiarylethers of the above stated general formula, for example those in which $x$ stands for bromine or iodine, or in which besides $x$ other substituents are present in the aryl nucleus, such as, for example, a further halogen atom, or those in which $y$ stands for $OCH_3$, $OC_2H_5$, Cl or Br, such as, for example 4-bromo-2-aminodiphenylether, 4:5-dichloro-2-aminodiphenylether, 4:5:4'-trichloro-2-aminodiphenylether, or also ortho-aminodiphenylether, ortho-amino-4'-chlorodiphenylether, ortho-amino-4'-methoxydiphenylether, ortho-amino-2':4'-dichlorodiphenylether, ortho-amino-2'-chlorodiphenylether, ortho-amino-5-nitrodiphenylether, ortho-amino-5-nitro-4:4'-dichlorodiphenylether, ortho-amino-5-nitro-4'-chlorodiphenylether, ortho-amino-4-benzoylaminodiphenylether, ortho-amino-4-ethylsulfonodiphenylether, ortho-amino-4-ethylphenylsulfamide-diphenylether.

*Example 3*

Cotton is padded in known manner with a solution of 12 grams of the α-naphthylamide of 2:3-hydroxynaphthoic acid and then developed with a solution containing per litre 50 grams of the preparation made as described in the preceding example and corresponding with about 20 per cent. of base, and 10 cc. of acetic acid of 80 per cent. strength. Red tints are obtained of the known good properties.

Instead of the α-naphthylamide, any other coupling component can be used, such as, among others, the anilide, para-chloranilide, β-naphthylamide of 2:3-hydroxynaphthoic acid; also 1-hydroxynaphthalene-4-phenylketone, aceto-acetic acid arylides, such as diaceto-acetic acid-ortho-tolidide; further, instead of the product of Example 1, other preparations made according to this invention can be used.

What I claim is:—

1. As new products the solid diazonium hydrochlorides of the general formula

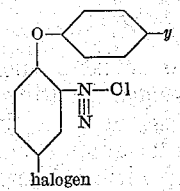

wherein $y$ stands for hydrogen or methyl.

2. As a new product the solid diazonium hydrochloride of the formula

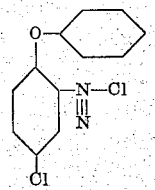

3. As a new product the solid diazonium hydrochloride of the formula

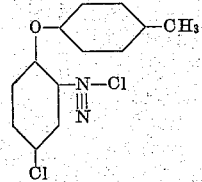

In witness whereof I have hereunto signed my name this 21st day of April, 1931.

HANS JOHNER.